United States Patent [19]

Discavage

[11] Patent Number: 5,913,060

[45] Date of Patent: *Jun. 15, 1999

[54] METHOD FOR DEADLOCK AVOIDANCE IN A DISTRIBUTED PROCESS SYSTEM USING A SYNCHRONOUS PROCEDURE CALL

[75] Inventor: Michael Jerome Discavage, Margate, Fla.

[73] Assignee: Citrix Systems, Inc., Fort Lauderdale, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/540,777

[22] Filed: Oct. 11, 1995

[51] Int. Cl.$^6$ .................................................. G06F 15/163
[52] U.S. Cl. ............................................................ 395/680
[58] Field of Search ............................... 395/200.14, 730, 395/608, 200.03, 425, 680; 364/281.5, 200.19; 707/8, 10

[56] References Cited

U.S. PATENT DOCUMENTS 4,887,204 12/1989 Johnson et al. ........................ 364/200
5,175,852 12/1992 Johnson et al. ........................ 395/608
5,202,971  4/1993 Henson et al. ........................... 395/425
5,341,478  8/1994 Travis, Jr. et al. ................. 395/200.03
5,583,992 12/1996 Kudō ................................. 395/200.03

*Primary Examiner*—Alvin E. Oberley
*Assistant Examiner*—Majid A. Banankhah
*Attorney, Agent, or Firm*—Testa, Hurvitz & Thibeault LLP

[57] ABSTRACT

A method for avoiding deadlock in a distributed process system that has a master process and a plurality of slave processes, in which the system uses a synchronous procedure call protocol that interchanges the role of the master process as the procedure call requester with the slave process role as the procedure call responder. In this manner the master process is never left in a deadlock state waiting for the slave process to respond. The role-switching is accomplished by initializing each slave process when initially connected to the system by having each slave process send a status message to the master process as the first part of the two-part synchronous procedure call protocol. This places the slave process in the role of the requester and the master process in the role of the responder. The slave processes are also re-initialized after responding to a master procedure call request by sending a status message indicating that the slave process is ready to receive another procedure call from the master process.

7 Claims, 3 Drawing Sheets

(PRIOR-ART)

(PRIOR-ART)

METHOD FOR DEADLOCK AVOIDANCE IN A DISTRIBUTED PROCESS SYSTEM USING A SYNCHRONOUS PROCEDURE CALL

FIELD OF INVENTION

The invention relates to distributed process systems having a master process and a plurality of service processes in which a synchronous procedure call protocol is used that requires a calling process to wait for a reply from a called process before proceeding to a next task.

BACKGROUND TO THE INVENTION

A distributed process application server system, such as the commercially available WinFrame™ system manufactured by Citrix Systems, Inc. of Coral Springs, Fla., and shown in FIG. 1, includes a master server 100 and a number of Win32 application servers 200. Each application server 200 may support multi-tasking of several applications at a remotely located workstation. Master server 100 controls access to the host systems resources that are to be shared between the Win32 application servers and provides the application servers with timely processed application data so that the user at a remote workstation is given the illusion that the user's application program is running locally at the workstation. This requires that all communications between master server 100 and all of the associated application servers 200 be efficiently carried out so that the effective throughput of the WinFrame™ system is maximized.

The WinFrame™ system's master server process handles the creation, deletion, connection and disconnection of remote user workstations. Separate application service processes are created, destroyed, and have their internal connection state manipulated by master server process 100. Command communications between master server process 100 and each Win32 application server use synchronous procedure calling techniques.

Synchronous procedure calling requires that when a master process places a call to a server process, the master process awaits a reply from the called server process before continuing on to its next task. Therefore, if an application server process 200 does not respond to a call from the master server process 100 (e.g. due to a temporary hardware failure or driver software error), master server process 100 is left in a virtual deadlock state. Because multiple Win32 application server 200 processes are dependent on master server process 100, the effects of a deadlock between the master server process and any application server process become widely spread throughout the system.

The present invention provides an effective means for avoiding deadlock while maintaining the desirable features of the synchronous calling procedure.

SUMMARY OF THE INVENTION

The invention is a method for avoiding deadlock in a distributed process system that has a master process and a plurality of application server processes and the distributed process system uses a synchronous procedure call protocol that requires a calling process to wait for a reply from a called process before preceding to a next task. The method includes initializing each application server process in the distributed process system by sending a status message from the server process to the master process that indicates to the master process that the server process is awaiting a service call and thereby informing the master process that the service process is available.

The method also includes re-initializing each application server process after completing a response to a command request from the master process by sending a status message indicating that the server process is awaiting a command request call.

By these two server process pre-emptive actions of initialization and re-initialization, the master process is never kept in a virtual deadlock state if, for any reason, an application server process from which service is requested is unable to respond in a timely manner.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiment but are only for explanation and understanding.

DETAILED DESCRIPTION OF THE INVENTION

A distributed process operating system operates by breaking up the traditionally monolithic function into a set of service processes. These service processes are managed by a central service process (master). When a request for an operating system service arrives that requires a new service process, the central service process initiates a new process to perform the requested service (slave). The master process continues to control and monitor the slave process and whenever a system service request is received by the master process that requires an action by the slave process, the master process instructs the slave process to perform the request.

Figure 1:
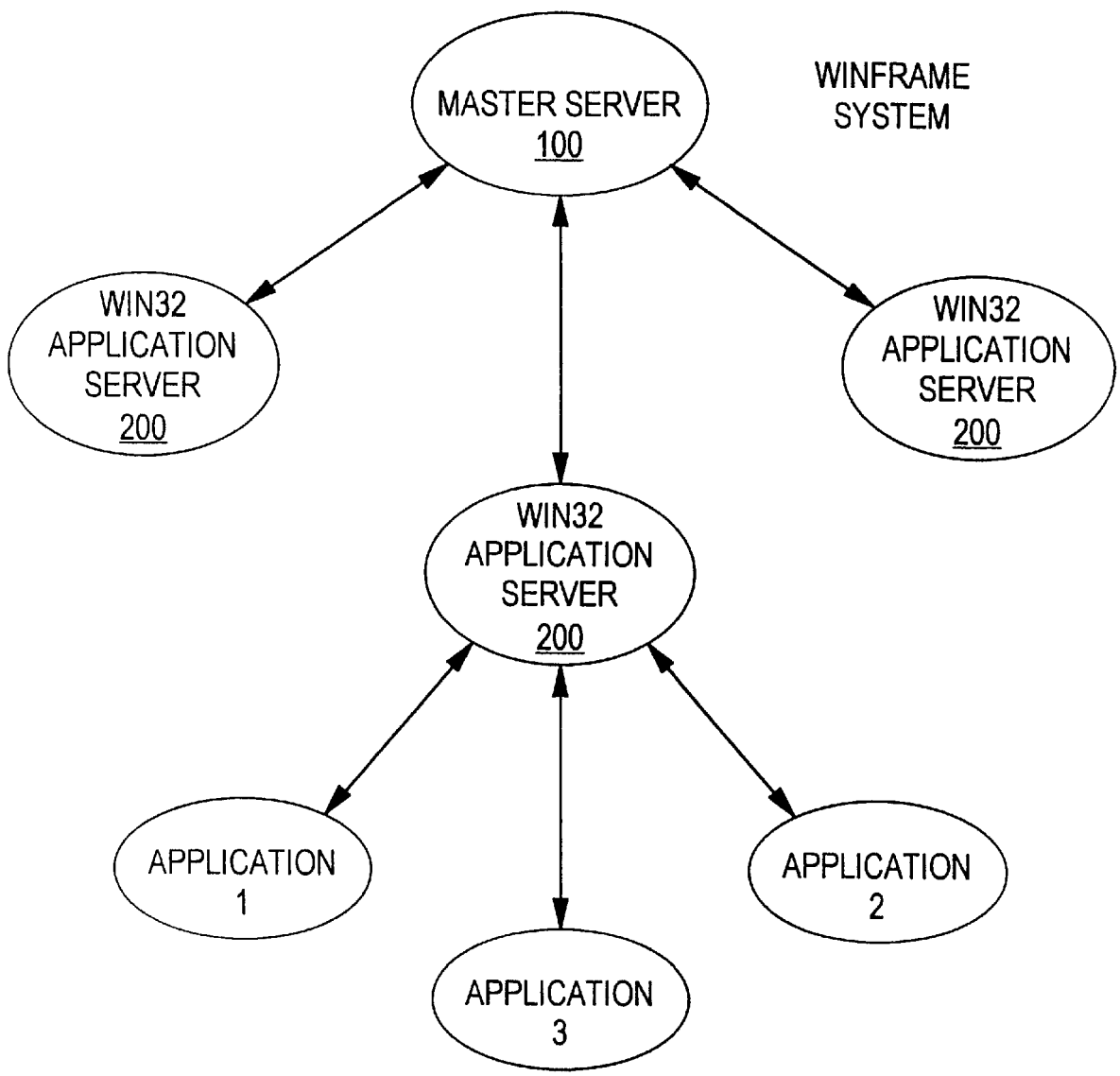
FIG. 1 shows a distributed process application server system.

A particular method of interprocess communication between between the master server process 100 and the application server processes 200 (FIG. 1) is referred to as a local procedure call (LPC), a technology developed for distributed message-based programming that makes the message communication appear as a normal high level language procedure call. High level language procedure calls are synchronous, i.e. the caller is blocked until the calling procedure is completed. This constraint is introduced to make synchronization of the call and the response to the call simpler.

Because the LPC is synchronous, a call from the master server process to the slave process (e.g. the application server) can result in an indefinitely long deadlock, or tie-up, of the master process due to system errors or failures. Consequently, over-all system performance can be adversely affected because many slave processes can be under the control of a master process at any given time.

Figure 2:
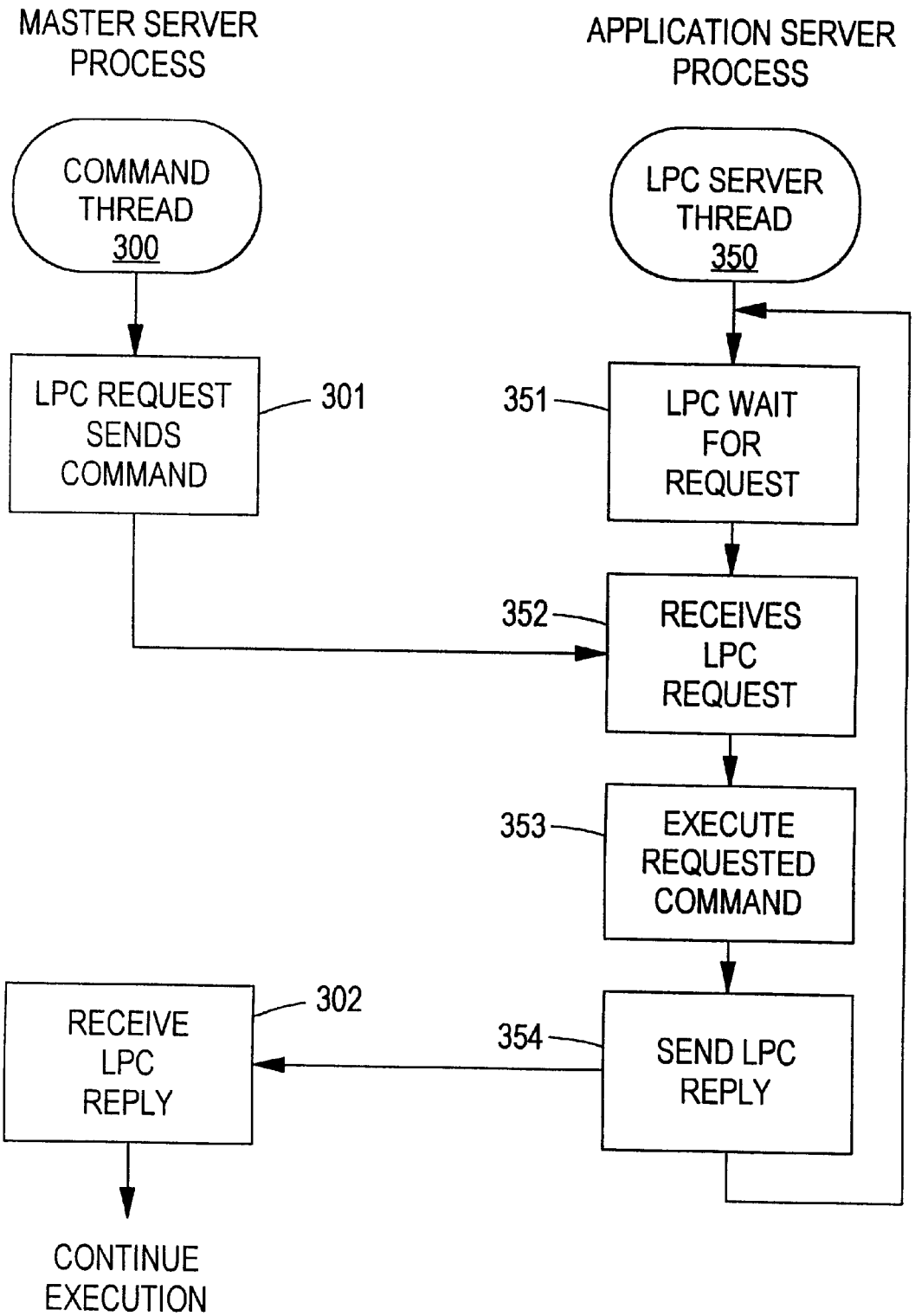
FIG. 2 is a flow diagram of a prior art LPC synchronous procedure call method that is subject to deadlock.

As an example of a synchronous call (LPC) that can lead to problems, consider the prior art master server process interaction with an application server process shown in FIG. 2. The master server process executes a command thread 300 that causes a LPC request (command) to be sent to an application server that is executing LPC server thread 350 which is a thread used to service all incoming LPC requests and return the results. Step 351 executes a wait while waiting for an LPC request from the master server process. In step 352, the application server process receives the LPC request and executes the requested command in step 353. The response due to the execution of the command is sent to the master server process in step 354 and then returns to step 351 to await the next command. In step 302, the master server receives the response from the application server and then continues to execute its assigned tasks.

From this description of the master server and the application server operating under a synchronous communication protocol (LPC), it is clear that each time the master server process initiates an LPC (as in step 301), the master server process is vulnerable to a deadlock condition upon failure of the client to respond. Thus, a minor glitch in the system while performing the requested command, that otherwise might be considered a minor reliability problem, can prevent the LPC server thread from ever reaching step 354. Because a number of application server processes can be dependent on a single master server process, the effect of the failure is magnified by shutting down the master server process and all the other associated application server processes.

One prior art solution has been to monitor the time to respond and, if the time exceeds a prefixed limit, to abort the LPC request and signal a system error. This method may reduce deadlock time but does not eliminate it. Also, this solution can only be used in a system in which an LPC request can be aborted. In a system such as Windows NT, which does not support aborting an LPC request, the only option is to terminate the LPC request thread. However, this is not a feasible solution because it is not possible to know which system resources may be used by the LPC request thread that would need to be released.

A preferrred inventive solution is to reverse the prior art request-response concept of an LPC so that each process under control of a master server process (slave) sends an LPC request at startup time to the master process (host) which remains in waiting until the master process has a request for the slave process.

Figure 3:
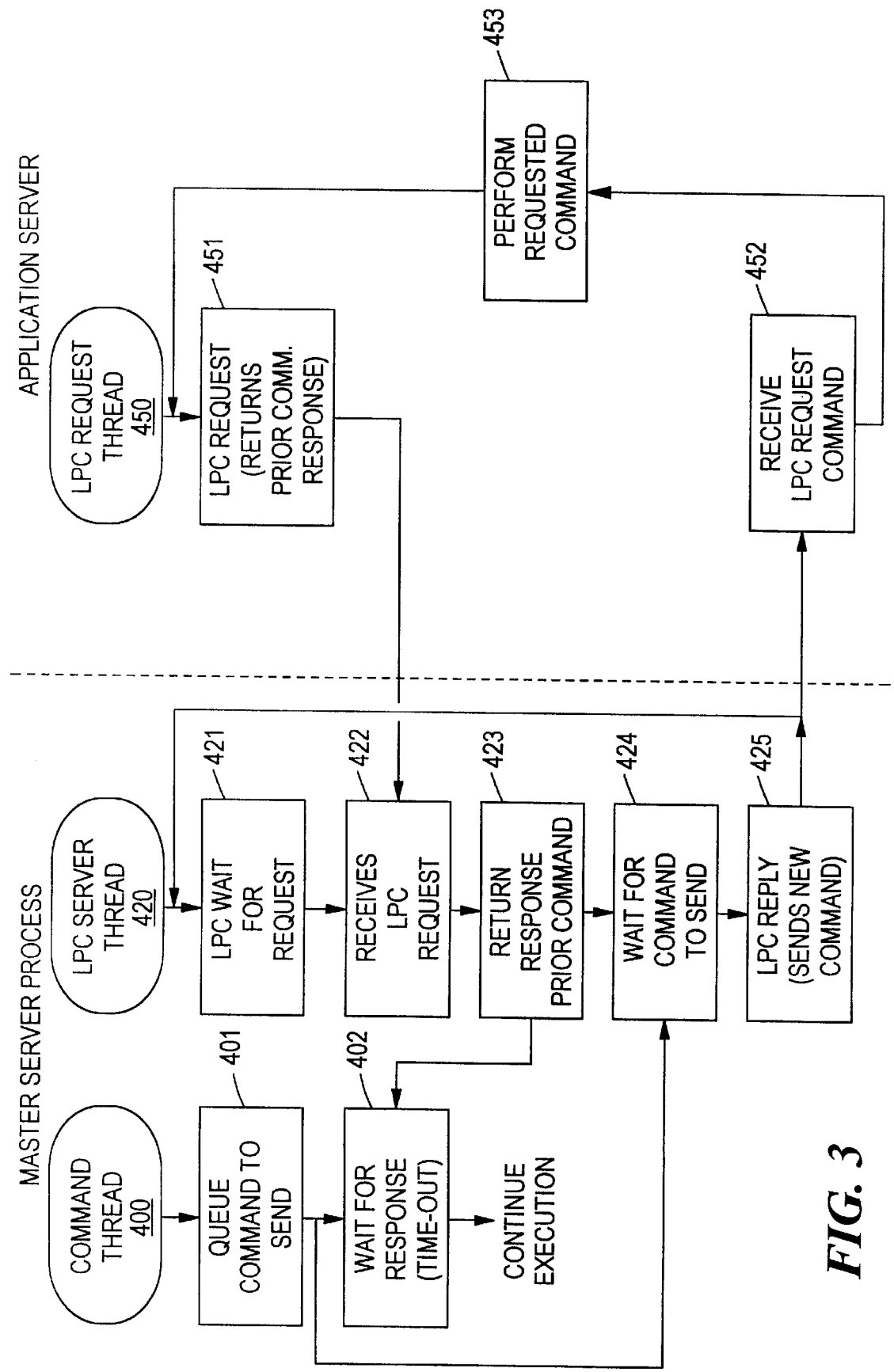
FIG. 3 is a flow diagram of a a LPC synchronous procedure call method that avoids deadlock.

FIG. 3 is a flow diagram of the inventive method for solving the LPC deadlock problem. The activity of the master server process is shown to the left of the vertical dotted line while that of the application server process is shown to the right. Two threads are used by the master server process: command thread 400 and LPC server thread 420. Command thread 400 queues the command that is to be sent to application server process 450 in step 401 and then proceeds to step 402 where a timer is started so that after a prescribed time has elapsed and no response to the previous command has been received from step 423 of LPC server thread 420, the master server process reports an error status and proceeds about its other tasks. Step 401 also sends the queued command to step 424 of the LPC server thread. LPC server thread provides an interface between command thread 400 and the LPC request thread 450 of the application server process. The LPC server thread at step 421 waits for an LPC command request and can remain in this wait state indefinitely without deadlocking master server command thread 400 (because of the time-out provision of step 402). When the LPC request is received, in step 422, step 423 returns the LPC request as the response to the prior command thread command. Upon receiving the response from step 423, step 402 allows the command thread to continue execution before the expiration of the time-out interval.

Referring to FIG. 3, LPC request thread 450 receives the LPC reply from step 425 of LPC server thread and interprets it as an LPC request command in step 452. The application server process performs the requested command in step 453 and returns the results to step 451. Step 451 returns the results to step 422 of LPC server thread 420 in the master service process where it is interpreted as an LPC request (but actually is a response to the last command from step 401 of command thread 400)

Thus, step 451 of LPC request thread 450 and step 422 of LPC server thread 420 reverses the roles of master and slave that is found in the prior art (the slave process becomes the caller while the caller process assumes the role of slave). By reversing the traditional roles, the method of FIG. 3 solves the deadlock problem of synchronous procedure calling while maintaining the desirable features of the synchronous technique.

By initializing the application server process LPC request thread 450 at step 451 by sending an LPC request, the LPC server thread 420 will indicate by step 423 to the master server command thread 400 that it can continue executing without the time-out in step 402. It should also be noted that the initialization is automatically accomplished after each subsequent command from the master server command thread 400 is performed.

As will be understood by those skilled in the art, many changes in the methods described above may be made by the skilled practitioner without departing from the spirit and scope of the invention, which should be limited only as set forth in the claims which follow.

What is claimed is:

1. A method for deadlock avoidance in a distributed process system having a master process and at least one slave process, the distributed process system using a synchronous procedure call protocol that requires a calling process to wait for a reply from a called process before proceeding to a next task, the method comprising the step of initializing a synchronous procedure call from a master process by a slave process, the slave process initiating a next process procedure call from the master process by sending a status message to the master process in anticipation of that next master process procedure call, thus causing each slave process to assume a role as a synchronous procedure call requester and the master process to assume a role as a synchronous procedure call responder.

2. The method of claim 1 wherein the step of initializing is performed by each slave process when initially connected to the distributed process system.

3. The method of claim 1 wherein the step of initializing is performed by each slave process after receiving and responding to a master process procedure call.

4. A distributed process system having a master process and at least one slave process, the system using a synchronous procedure call protocol that requires a calling process to wait for a reply from the called process before proceeding to a next task, the synchronous procedure call protocol comprising the step of initializing a synchronous procedure call from a master process to a slave process by having the slave process initiate a next master procedure call to itself by sending a status message to the master process in anticipation of the next master process procedure call, thus causing the slave process to assume a role as a synchronous procedure call requester and the master process to assume a role as a synchronous procedure call responder.

5. The distributed process system of claim 4 wherein the step of initializing is performed by a slave process when initially connected to the distributed process system transport mechanism.

6. The distributed process system of claim 4 wherein the step of initializing is performed by a slave process after receiving and responding to a master process procedure call request.

7. A method for deadlock avoidance in a master process, the master process communicating with one or more slave processes using a synchronous procedure call protocol that requires a calling process to wait for a reply from the called process before proceeding to a next task, the method comprising the steps of:

(a) providing a command thread and an LPC server thread at the master server process;

(b) at the command thread, queuing a command to be sent to the slave process;

(c) at the command thread, sending the queued command to the LPC server thread;

(d) at the LPC server thread, waiting for an LPC command request; and (e) at the LPC server thread, receiving an LPC command request and allowing the command thread to continue execution of the queued command.

* * * * *